(12) United States Patent
Shuster

(10) Patent No.: US 9,049,234 B2
(45) Date of Patent: Jun. 2, 2015

(54) HTTP TRIGGER FOR OUT-OF-PROTOCOL ACTION

(76) Inventor: Gary Stephen Shuster, Fresno, CA (US)

(*) Notice: Subject to any disclaimer, the term of this patent is extended or adjusted under 35 U.S.C. 154(b) by 850 days.

(21) Appl. No.: 12/699,603

(22) Filed: Feb. 3, 2010

(65) Prior Publication Data

US 2010/0205053 A1 Aug. 12, 2010

Related U.S. Application Data

(60) Provisional application No. 61/149,591, filed on Feb. 3, 2009.

(51) Int. Cl.
| | |
|---|---|
| *G06Q 99/00* | (2006.01) |
| *H04L 29/06* | (2006.01) |
| *G06Q 20/10* | (2012.01) |
| *G06Q 20/34* | (2012.01) |
| *G06Q 20/38* | (2012.01) |
| *G06Q 30/02* | (2012.01) |
| *G07F 17/00* | (2006.01) |
| *G07F 17/24* | (2006.01) |
| *G06Q 30/06* | (2012.01) |
| *G06Q 20/28* | (2012.01) |
| *G06Q 20/36* | (2012.01) |

(52) U.S. Cl.
CPC ............ *H04L 63/18* (2013.01); *G06Q 30/0635* (2013.01); *G06Q 20/28* (2013.01); *G06Q 20/367* (2013.01); *G06Q 20/102* (2013.01); *G06Q 20/351* (2013.01); *G06Q 20/385* (2013.01); *G06Q 30/0215* (2013.01); *G07F 17/0028* (2013.01); *G07F 17/24* (2013.01)

(58) Field of Classification Search
CPC ............ G06Q 20/367; G06Q 30/0635; G06Q 20/385; G06Q 20/28
USPC ........................................ 705/26.1, 26.8, 53
See application file for complete search history.

(56) References Cited

U.S. PATENT DOCUMENTS

| | | | |
|---|---|---|---|
| 6,038,296 | A | 3/2000 | Brunson et al. |
| 6,735,621 | B1 | 5/2004 | Yoakum et al. |
| 6,891,933 | B2 | 5/2005 | Kumamoto |
| 6,898,524 | B2 | 5/2005 | Horikami |

(Continued)

FOREIGN PATENT DOCUMENTS

| | | | | |
|---|---|---|---|---|
| WO | WO2007/012808 | * | 2/2007 | ............ G06Q 20/00 |
| WO | WO2007012808 | * | 2/2007 | ............ G06Q 20/00 |

OTHER PUBLICATIONS

Draft-wilde-sms-uri-16, "URI Scheme for GSM Short Message Service", Network Working Group, Internet Engineering Task Force, Aug. 2008, 23 pages.*

*Primary Examiner* — James D Nigh
(74) *Attorney, Agent, or Firm* — Jonathan Jaech Snell & Wilmer L.L.P.

(57) ABSTRACT

A hypertext transfer protocol (HTTP) request is used to actuate a secondary communications protocol (e.g., Short Message Service). A server receiving the request may be configured to take actions not specified by the URL associated with the request in response to the characters encoded in the request, such as accessing a secondary communications protocol. The server parses the request to identify action codes and/or content in the request itself, and takes action based on the code or content value. A token code representing a value or fixed number of uses may be utilized in connection with the techniques disclosed herein.

20 Claims, 4 Drawing Sheets

(56) References Cited

U.S. PATENT DOCUMENTS

| | | |
|---|---|---|
| 7,136,932 B1 * | 11/2006 | Schneider .................... 709/245 |
| 7,209,950 B2 | 4/2007 | Bennett et al. |
| 7,349,971 B2 | 3/2008 | Morris |
| 2001/0034225 A1 | 10/2001 | Gupte et al. |
| 2002/0112014 A1 | 8/2002 | Bennett et al. |
| 2005/0071269 A1 * | 3/2005 | Peters ............................. 705/40 |
| 2005/0187873 A1 * | 8/2005 | Labrou et al. ................... 705/40 |
| 2005/0193117 A1 | 9/2005 | Morris |
| 2006/0026237 A1 | 2/2006 | Wang et al. |
| 2006/0095526 A1 | 5/2006 | Levergood et al. |
| 2007/0239837 A1 | 10/2007 | Jablokov et al. |
| 2008/0201266 A1 * | 8/2008 | Chua et al. ...................... 705/67 |
| 2008/0250108 A1 | 10/2008 | Levy |
| 2008/0256201 A1 | 10/2008 | Flowers et al. |
| 2009/0013087 A1 | 1/2009 | Lorch et al. |

\* cited by examiner

HTTP TRIGGER FOR OUT-OF-PROTOCOL ACTION

CLAIM OF PRIORITY UNDER 35 U.S.C. §119

This patent application claims the benefit of U.S. Provisional Patent Application No. 61/149,591, filed Feb. 3, 2009, which is specifically incorporated by reference herein in its entirety.

BACKGROUND OF THE INVENTION

1. Field of the Invention

The present invention is directed toward systems for actuating out-of-protocol actions and adjusting any payment accounts associated with the actuated out-of-protocol actions, and related methods.

2. Description of the Related Art

It is a common occurrence that those with access to one communications protocol may need to communicate via a different communications protocol that may be either unavailable or more difficult to access. For example, mobile telephone service providers have long provided websites and web-based forms that enable text messages to be sent to their subscribers. While the use of one communications protocol to actuate a gateway to another protocol is known, it typically requires interaction or bidirectional communication between the client and the web server and is therefore vulnerable to hackers, identity thieves and others who seek to obtain unauthorized access to personal information that may be exchanged. Such known uses of communications protocols are particularly susceptible to hackers when the user is on an unsecured computer (e.g., a public computer at the library) or an unsecured network.

Therefore, it would be desirable to provide communication techniques utilizing hypertext transfer protocol (HTTP), or portions thereof, to overcome these and other limitations of the prior art.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its purpose is to present some concepts of one or more embodiments in a simplified form as a prelude to the more detailed description that is presented later.

In accordance with one or more embodiments and corresponding disclosure thereof, there is provided a method for actuating an out-of-protocol action(s) and adjusting any payment accounts associated with the actuated out-of-protocol action(s). For example, the method may involve, on a computer (e.g., a web server), receiving a hypertext transfer protocol (HTTP) request of a Uniform Resource Locator (URL) via a first communications protocol, the request including a token code as a character string or sequence in the URL, the token code being associated with a payment account. The URL including the token code may also include an action code separate and distinct from the token code. The action code may also be made up of a character string or sequence included in the URL. In the alternative, or in addition, the action code may be associated with the URL via the token code or other identifier. The URL including the token code and action code may further include message content capable of being recognized and used as input for the requested action; for example, text content for transmission via a second communications protocol. The message content may also be included in the URL as a character string or sequence.

The URL itself may be generally understood as the global address for documents or other digital content on the World Wide Web. Each URL may be formatted as a unitary discrete character string comprising two parts: a first part used as a protocol identifier and a second part used as a resource address. An HTTP request functions to request the digital content at the resource address according to the HTTP protocol. It should be appreciated that other protocols, e.g., FTP, may similarly be adapted for use as disclosed herein, and the present technology is not strictly limited to use of the HTTP protocol. As used herein, a "URL request" means a character string formatted as a URL and capable of functioning as a request for a network resource connected to the Internet or other wide area network, and identifying a specific communications protocol, for example, HTTP or FTP.

The method may further include, in response to the request, performing a requested service or action (e.g., transferring funds, making payments, adding money to a parking meter or rechargeable account, purchasing show tickets, sending/receiving text messages, accessing a music streaming service, etc.). The method may include debiting the payment account according to the token code in the URL. The method may include performing some other action related to the payment according to the action code in the URL, for example, crediting a parking meter, issuing an admission ticket, transmitting a message via a second communication protocol, or providing a payment receipt.

In accordance with one or more embodiments and corresponding disclosure thereof, there is provided an apparatus for actuating out-of-protocol action(s) and adjusting any payment accounts associated with the actuated out-of-protocol action(s). For example, the apparatus may be configured as a web server or as a processor or similar device. The apparatus may comprise an electrical component, such as, for example, a computer processor, for receiving a request of a URL identifying a first communications protocol (e.g., HTTP or FTP), the request including a token code in the URL, the token code being associated with a payment account.

The apparatus may further comprise an electrical component for performing a requested service (e.g., sending a text message to a given phone number) via a second communications protocol (e.g., SMS communications protocol), in response to the request according to an action code included in the URL. The apparatus may comprise an electrical component for adjusting (e.g., debiting or crediting) the payment account according to the token code in the URL.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
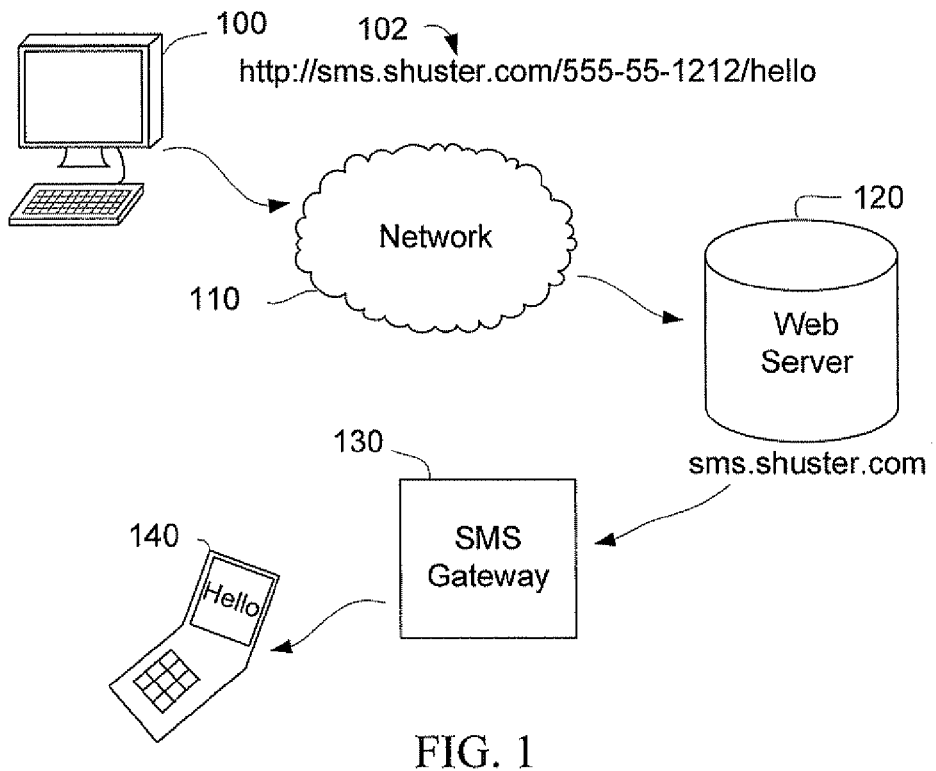
FIG. 1 provides a block diagram of an exemplary system for using an HTTP request to actuate an SMS communications protocol.

FIG. 1 is a block diagram showing an exemplary application that utilizes an hypertext transfer protocol (HTTP) request to actuate a Short Message Service (SMS) communications protocol. Client 100 makes an HTTP request 102 using a web browser or other end-user tool, which is transmitted via a network 110 to a web server 120. The request 102 may pass through several intermediaries, such as proxies, gateways and tunnels (not depicted) in between the client 100 and the web server 120. In the embodiment illustrated in FIG. 1, the web server 120 hosts sms.shuster.com and actuates an SMS gateway 130.

In accordance with the example illustrated in FIG. 1, a user operating the client 100 may send an SMS text message to a mobile telephone having 140 having a telephone number (555) 555-1212. The user submits a simple request, http://sms.shuster.com/555-555-1212/Hello from the client 100 to port 80 of the web server 120. The web server 120 parses the Uniform Resource Locator (URL) and sends the text message "Hello" to the mobile telephone 140 via the SMS gateway 130.

The client 100 or other device associated with the client 100 or user operating the client 100 may be identified as the text message sender. For example, the web server 120 may recognize the client 100 from the originating IP address, cookie, or other identifying characteristic or information in the request or URL. Thus, the recipient of the text message sent to the mobile telephone 140 may be able to send a response to the client 100 or an associated device.

It is noted that a network device, such as, for example, the web server 120, that receives the request (e.g., HTTP request) may take actions that are not specified by the identified communications protocol (e.g., HTTP) in response to the characters encoded in the request or URL, including, for example, accessing a secondary communications protocol (e.g., SMS communications protocol). The network device may parse the request to identify action codes and/or message content in the request itself (i.e., the received URL), and may take action based on the code or content value. For example, if the received request includes a predetermined code followed by a ten-digit number which is followed by a text string, the network device may send the text string to an SMS address. The network device may optionally send a response (e.g., a confirmation message) to a client device from which the request was sent.

In the embodiment described in FIG. 1, the URL or portions thereof are used by the web server to actuate the SMS or other secondary communications protocol. For example, the web server may recognize a reserved character string in the URL. In response, the web server may actuate the secondary communications protocol. In addition, or in the alternative, the web server may recognize other factors or information associated with an HTTP request (whether GET, PUT, HEAD, or otherwise) or other request communicated using a URL. The web server may be programmed to recognize these other factors or information as triggers for initiating the SMS or other secondary communications protocol. Such factors may include, for example, an IP address, ping times, HTTP header information such as browser type, or the network from which the request originated. The Web server may be configured to recognize predetermined information of this type as a trigger, actuating the secondary communications protocol in response to receiving an HTTP request accompanied by the other factors or information.

The web server may transmit a response to the HTTP request, indicating whether the message was successfully forwarded to the secondary communications protocol gateway. Notwithstanding this, the web server accesses the secondary communications protocol and transmits a message thereon as determined by the URL of the HTTP request, regardless of whether a response to the HTTP request can or has been made. For example, reformulation of the request may be required where the requested resource resides under a different URL. In this example, a request, such as http://shuster.com, may be submitted, in response to which a 302 MOVED response instruction may be received by the client to reformulate and resubmit the request to http://www.shuster.com. The user operating the client will not likely see the 302 MOVED response instruction, as the client automatically reformulates and resubmits the request.

In a preferred embodiment, a paid or other metered account may be debited as a result of sending the request to the web server or receiving the message at an SMS or other client. The paid or metered account may be implemented using a token, which represents a value or fixed number of uses. For example, a token may be represented as a code, e.g., "ga-u9993r", that is provided in connection with the HTTP request, e.g., http://sms.shuster.com/555-555-1212/ga-u9993r/hello. When the HTTP request is submitted, an accounting server (which may be implemented in the web server or affiliated machine) may decrement an account value associated with the token ga-u9993r by a monetary or other unit. Optionally, advertising may be appended to the text message and a credit may be applied to the token or an account associated with the token. The credit may be a fixed amount per advertisement, a portion of the advertising revenue, or other amount.

In a preferred embodiment, the web server recognizes single-use tokens. Because single-use tokens are exhausted after each use, they do not require a response to an HTTP request. Thus, a simple HTTP request actuates a complete communication session through a secondary data path portal. For example, a simple command line telnet session over port 80 utilizing HTTP may be used to actuate a SMS message transmission through a gateway, i.e., "telnet sms.shuster.com:80" followed by "GET/555-555-1212/hello". This is in contrast to certain embodiments of multiple-use tokens, which may require a response to the HTTP request to inform the user of the balance remaining on the token or whether the token has been completely exhausted.

An advantage the systems and methods disclosed herein is that even simple embedded web clients, such as those found in handheld devices and toys, may be utilized to send text messages. Particularly, secured transactions may be conducted from non-secure computers, such as those in libraries or public places, and from computers that do not have secured connections.

Figure 2:
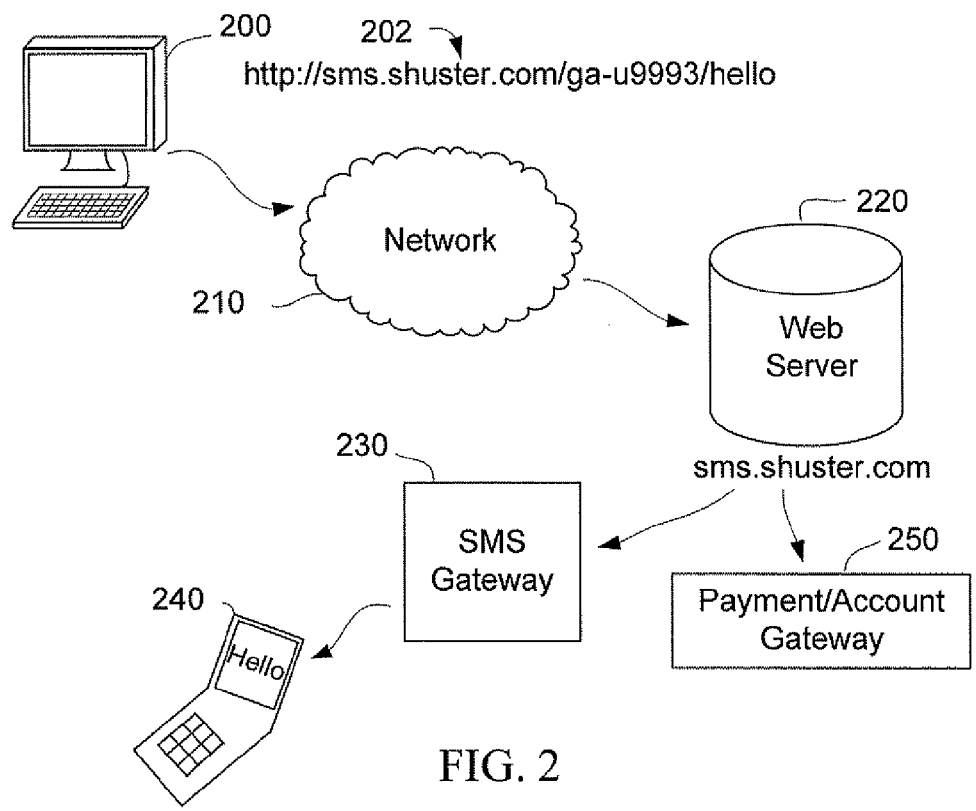
FIG. 2 provides a block diagram of an exemplary system for using an HTTP request to actuate an SMS communications protocol and to adjust a payment account.

In one embodiment, shown in FIG. 2, token codes are keyed to a specific transaction path. For example, the token code ga-u9993r might be good for a single use text message to 555-555-1212 only. Thus, user need only type the token code and the message, thereby preventing even the recipient phone number from being revealed. In use, this might look like http://sms.shuster.com/ga-u9993r/hello, which request would send the message "hello" to 555-555-1212. If the code were to be seen or stolen subsequent to its use, it would be useless to the thief, and there would be no way to determine the identity or the number to which text messages may be sent to using the token code. Optionally, the web server may be configured to return a specified HTTP code or result to indicate a successful (or non-successful, or other status) use. For example, success might result in returned "302 MOVED http://cnn.com/" while failure might result in a "302 MOVED http://example.com/".

For example, the user of client 200 types the URL 201 as http://sms.shuster.com/ga-u9993r/hello using a web browser or other end-user application. The client 200 sends an HTTP request as the URL via network 220 to a web server 220. The HTTP request may be passed through several intermediaries, such as proxies, gateways and tunnels (not depicted) in between the client 200 and the web server 220. It is noted that the URL 201 includes the token code ga-u9993r that may be associated with a payment account or the like. In addition, the token code ga-u9993r might be good for a single use text message (e.g., "hello") to a preset or predefined number (e.g., 555-555-1212).

The web server 220 may host sms.shuster.com and may initiate a transaction with a payment/account gateway 250 for adjusting any payment accounts associated with the token code (e.g., ga-u9993r) in the URL. The web server 220 may be in operative communication with the payment/account gateway 250. In the alternative, or in addition, the payment/account gateway 250 may be in operative communication with one or more service gateways (e.g., SMS gateway 230 which sends SMS text messages to mobile device 240). If used, service gateways may be configured to perform requested services (e.g., requests coded into the URL using an action code or otherwise associated with the HTTP request), such as, for example, debiting a user account for payment to one of an online store account, a vending machine account, a parking meter account, and a rechargeable cellular phone account. In some embodiments, the web server 220 detects out-of-protocol requests (e.g., predetermined special character sequences such as action codes) embedded in incoming HTTP requests, and responds to each incoming request by generating a second request using a computing or database process. The computing or database process uses the incoming out-of-protocol request, optionally with other portions of the HTTP request, to determine the content of the second request. For example, the web server may use a database query or data table lookup using the out-of-protocol request as a query string to identify parameters of the second request. In the alternative, or in addition, the web server may pass out-of-protocol characters from the HTTP request to a payment gateway, service gateway, or other server to determine responsive actions.

It is noted that the payment/account gateway 250 may comprise an e-commerce application service provider that authorizes payments to/from or transfers in funds between e-businesses, online retailers, bricks-and-clicks, or traditional brick and mortar businesses/entities. The gateway 250 typically protects payment account details (e.g., associated bank or credit card accounts, user information, token codes, etc.) by encrypting sensitive information to ensure that information passes securely between the customer and the merchant and also between merchant and payment processor. For example, gateway 250 may facilitate the transfer of information between a payment portal (such as a website, mobile phone or interactive voice response service) and a front end processor or acquiring bank.

Token codes are not limited to SMS applications and may be used in a variety of other applications and communications protocols. For example, the token codes may also be used in connection with fund transfer. For example, a user may obtain a token code that represents a one dollar credit for a network connected device, such as an online store, a vending machine, a parking meter, a rechargeable cellular phone account, or other device or use. In a situation where the user does not want to compromise his credit card or other account information, the user may enter an active URL targeting a code representing the device, the account to be credited (unless already encoded for in the credit code) and the credit code. Thus, for example, http://parkingmeter.nyc.shuster.com/meter193831/code9d9ac9ad may credit one dollar to the parking meter. Because the code may be entered on any machine capable of simple HTTP communications and requires no security, the user may transfer funds to the parking meter by entering the token code on an unsecured computer and/or network.

In accordance with one aspect of the preferred embodiment, the token code may be distributed on, or usable in conjunction with, an encryption device used to encrypt the SMS message content. The encryption may be provided through a program on a wallet size card with a miniature keyboard. In the alternative, the token code may be distributed to the end user via an application installed on a mobile device piece of hardware. For example, the mobile application may generate an authentication or token code at fixed time intervals using a built-in clock and a factory-encoded random key or the like. The end user may input the distributed token as text making up part of a URL.

Optionally, a confirmation that the HTTP request (the active URL) has successfully actuated the requested payment and action may be sent via a secondary communication protocol. The confirmation and addressing information may be encoded into the token code, associated with the token code in a database, or made part of the HTTP request or active URL.

For example, the URL of http://parkingmeter.nyc.shuster.com/meter1938311 code9d9ac9ad/confirm_sms_555-555-1212 may use a primary communications channel (an HTTP GET request) to actuate and transmit over a secondary communication channel (the backend connection to the parking meter network), optionally wait for a response from the secondary channel (i.e. payment accepted), and then transmit the result to a tertiary communications channel (i.e. the cell phone of the user). Additional confirmations may be sent via the same or different channels, for example, a confirmation that the request was made, followed by a status code when available. In a preferred implementation, the confirmation mode, including a preference for whether the confirmation be that the request was submitted, the request was successful, both, or otherwise, would be encoded into the token code.

In another implementation, the communication over the secondary communication channel would specify a confirmation target which would then be sent by the recipient of the data sent over the secondary communication channel. For example, the URL http://parkingmeter.nyc.shuster.com/meter193831/code9d9ac9ad when sent to the primary communication server (i.e. the web server) results in the token code being looked up in a database (or the URL contains the data that would otherwise be found in the database). If the token code is found in the database, then the parking meter server may be asked to send a confirmation of the deposit via SMS to 555-555-1212 indicating the meter number and amount credited, and potentially the total time and/or money left on the meter after the transaction, and/or the total time left at which the car may remain in that parking spot without being ticketed for exceeding the maximum parking time.

Optionally, an additional charge may be made, or value debited against the value of the token code prior to utilizing the token code for its primary purpose (in this case paying the meter) in order to pay for the confirmation or other data being requested of the secondary server via the return data path (i.e. the parking meter server sending an SMS).

In related aspects, a follow-up communication (e.g., an SMS message) may be sent using the parking meter server and/or associated servers, wherein the communication reminds the user that the time in the parking meter has run out or is about to run out. In the alternative, or in addition, the follow-up communication may provide the user with option of adding additional time to the parking meter, such as, for example, entering another token code into the URL via a web browser application on a mobile device (e.g. http://parking-meter.nyc.shuster.com/meter193831/code9d10v62). This way the user may be provided the option of purchasing additional time for the parking meter without having to walk out to a physical parking meter. It is noted that certain parking meters have a time limit, such as, for example, two hours during which a given car may be parked in a spot. In further related aspects, the follow-up communication may provide the user with option of paying a penalty fee to park his/her car in a given spot beyond the time limit. Such a penalty fee might, if paid in advance of violating the time limit rule, be less than the penalty charged for a parking ticket.

HTTP was originally designed as a stateless connection, meaning that a connection is opened by the client on port 80 to the server. Data is typically requested from the server via a GET statement, the server returns the data or a status code, and the connection is terminated. This systems and methods disclosed herein utilize only that half of the original stateless connection be maintained in order to cause an HTTP request to actuate some real world or secondary effect. Furthermore, communications between a primary data connection and a secondary data connection (such as SMS messaging via the web) have required a pseudo-stateful connection. That is, the client asked for the text messaging web page and the server returned that page. The client then had to use that form to request that page, requiring at least a second connection be opened between the same two machines. Furthermore, existing art sends confirmation of the result of the request via, at minimum, the response code from the HTTP server. The systems and methods disclosed herein allows a confirmation to be sent only along a secondary or tertiary channel, and avoids the problem in the existing art whereby a web request is made, a channel to a secondary server is opened by the web server, and then a breakdown occurs after the request has been successfully submitted along the secondary channel, preventing the user from knowing that the request was successful. For example, a common problem associated with such failures sometimes results in credit card purchase requests being made repeatedly, causing duplicate charges, when a communication failure or configuration error prevents the web server from sending confirmation to the web client but does not prevent the web server from receiving (multiple) client requests and acting on them. By using the tertiary communications channel confirmation mechanism disclosed herein, the user may submit the request only one time and wait for confirmation—of success or failure—via the alternative communication mechanism. In some embodiments, a confirmation may be contemporaneously sent via a secondary confirmation channel and via a response to the HTTP GET or other HTTP request.

In another aspect of embodiments described herein, a time-pass ("expirable") token code may be used to alter the function, connectivity, or features of the device it is entered on. For example, in response to a time-pass token code in the URL "http://real.shuster.com/token-asdockasdock," the machine receiving the URL may transmit a request to a server which would then either authenticate the request via a secondary channel, or redirect the request with an authentication code to a tertiary channel. In either case, in response to authentication the machine then allows the device from which the URL originated access to specified services for a specified, limited amount of time. In the example, one might enter the token code and thereby gain access to web content (e.g., music) streaming service for a specified amount of time.

Expirable token codes utilized for account access may link to an existing account until expiration of the code, at which time the link would no longer function. For example, if a music streaming service allowed members 10 hours a month of streaming, the user may input the expirable token code and thereby obtain access to the service on the new computer. When the user logs out, the token code will have already expired, and any keylogging or other software, or poorly maintained cache security, would not compromise the security of the account to which the expirable token code was linked. Used even in sensitive modes, such as for online fund transfers, the expirable token code linking to the main account would prevent any subsequent user from emptying the linked bank account after the expirable token code has been logged out even once. In a preferred implementation, when operating with an expirable token code as the login, certain sensitive information would not be displayed. Thus, for example, a user logging into their bank account might be able to only see the amount of funds available for transfer, but not account numbers, specific transactions, or other information that would be damaging if compromised. Access to a service or account using a reduced function expirable token in a URL represents a significant security and utility benefit over the existing art.

Figure 3A:
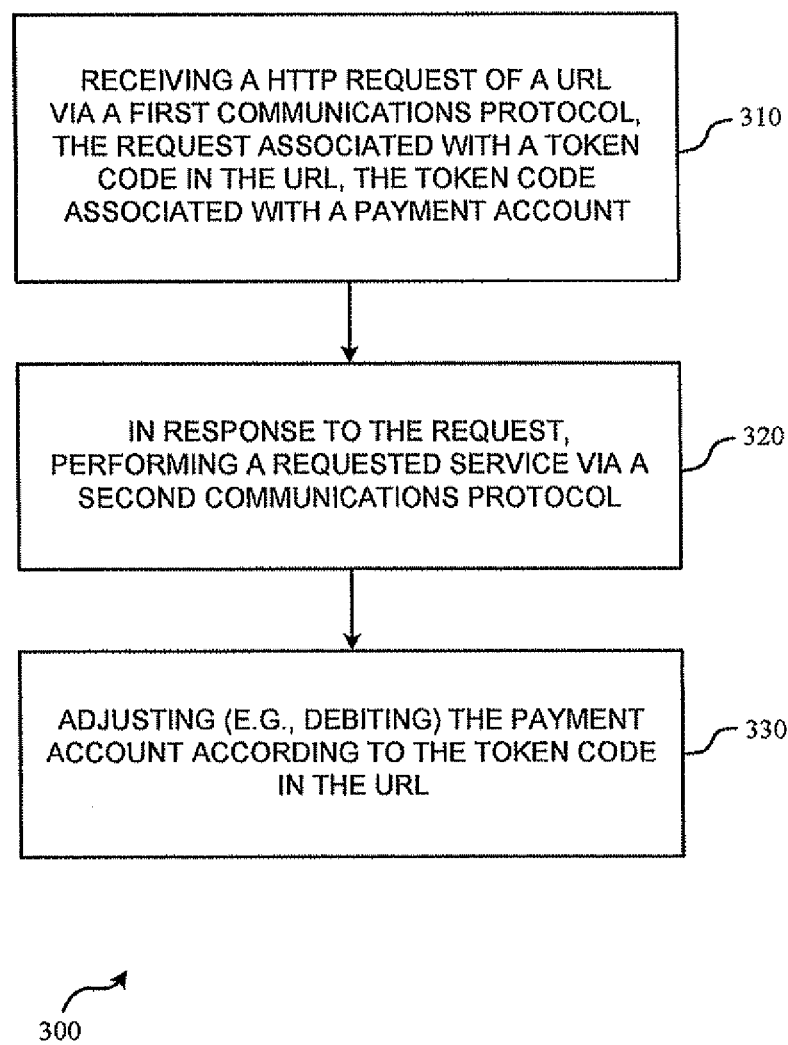
FIG. 3A illustrates one embodiment of a method for actuating an out-of-protocol action.

In accordance with one or more aspects of the embodiments described herein, there are provided methods for actuating out-of-protocol action(s) and adjusting any payment accounts associated with the actuated out-of-protocol action(s). With reference to FIG. 3A, there is provided an exemplary method 300 that may involve, at step 310, receiving a hypertext transfer protocol (HTTP) request of a Uniform Resource Locator (URL) via a first communications protocol, the request including a token code in the URL, the token code being associated with a payment account. In response to the request, the method 300 may involve performing a requested service via a second communications protocol (step 320). At step 330, the method 300 may involve adjusting (e.g., debiting) the payment account according to the token code in the URL.

Figure 3B:
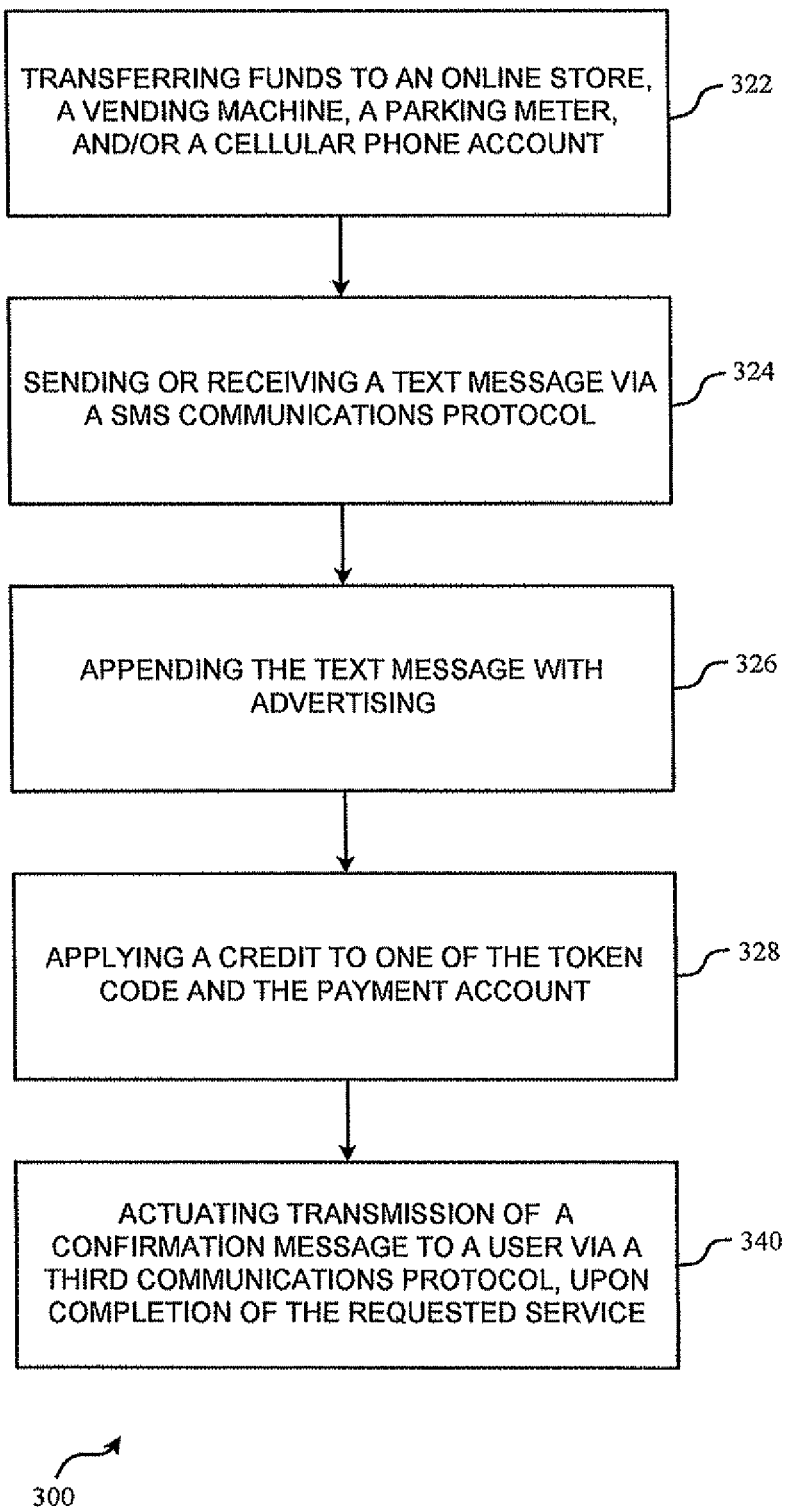
FIG. 3B shows further aspects of the method illustrated in FIG. 3A.

In related aspects, with reference to FIG. 3B, step 320 may comprise transferring funds to one of an online store, a vending machine, a parking meter, and a cellular phone account (step 322). In the alternative, or in addition, step 320 may comprise sending or receiving a text message via a Short Messaging Service (SMS) communications protocol (step 324). Step 320 may further comprise appending the text message with advertising (step 326), and applying a credit to one of the token code and the payment account (step 328).

In further related aspects, the token code may represent at least one of a fixed number of uses (e.g., a single-use token) and a value in the payment account. In yet further related aspects, the second communications protocol comprises at least one of Dynamic Host Configuration Protocol (DHCP), Domain Name System (DNS), File Transfer Protocol (FTP), General Packet Radio Service (GPRS) Tunneling Protocol (GTP), Internet Message Access Protocol (IMAP), Internet Relay Chat (IRC), Network News Transfer Protocol (NNTP), Post Office Protocol (POP), Routing Information Protocol (RIP), Real-time Transport Protocol (RTP), Real Time Streaming Protocol (RTSP), Simple Mail Transfer Protocol (SMTP), Telnet, SMS communications protocol, or the like. In one example, the method 300 may involve, receiving the request for service(s) via HTTP and performing the requested service(s) using DHCP. In still further related aspects, the method 300 may involve actuating transmission of a confirmation message to a user via a third communications protocol; upon completion of the requested service (step 340).

It is noted that one or more of the steps of method 300 may be performed on a web server, a memory/processor associated with the server, or a computing device in operative communication with the server. It is further noted that the steps of method 300 may be performed in a distributed manner by a plurality of computers in operative communication with each other via one or more interlinked networks. It is also noted that one or more of the steps of method 300 may be performed by at least one client device or component thereof.

Figure 4:
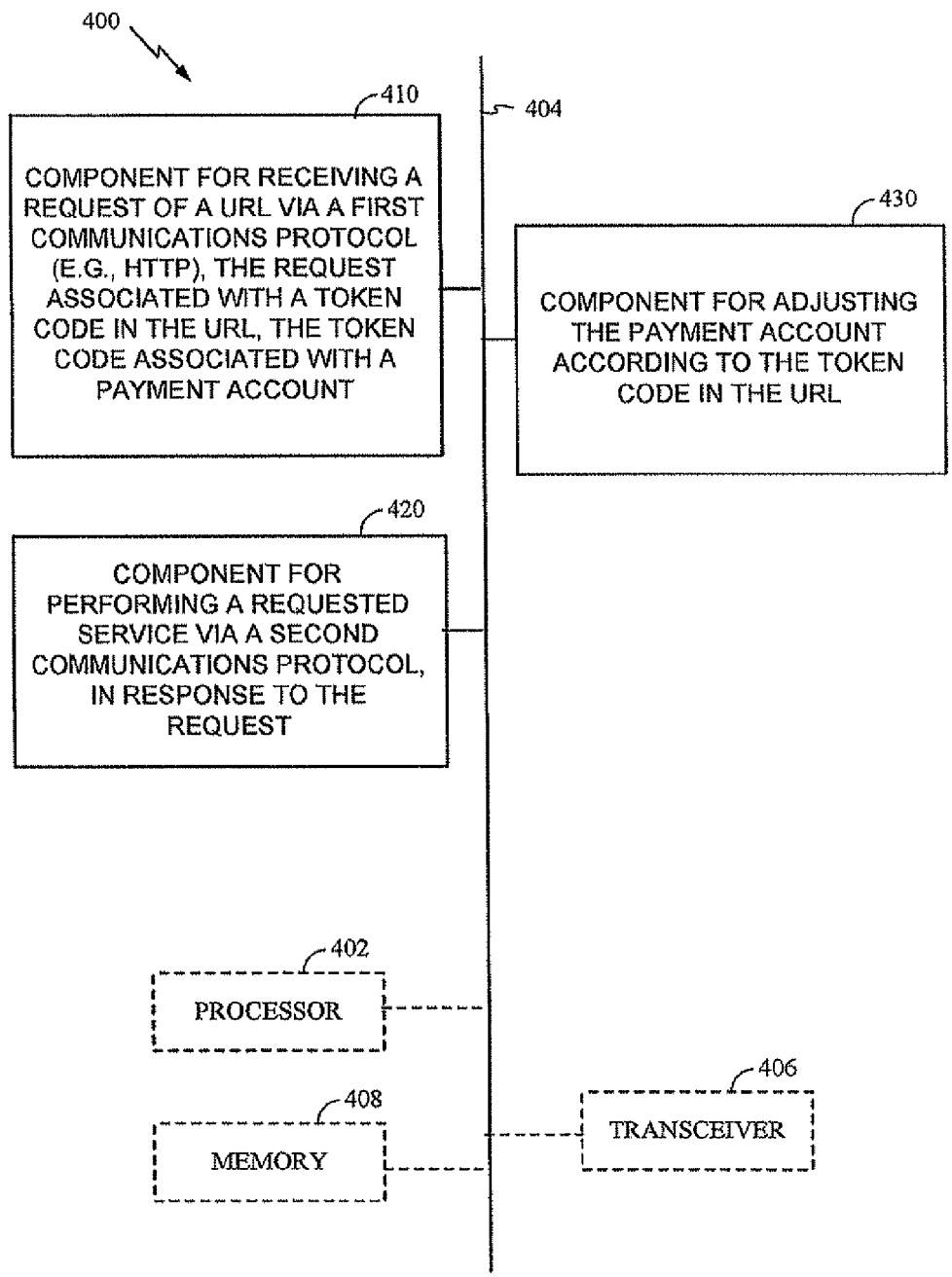
FIG. 4 illustrates one embodiment of an apparatus for actuating an out-of-protocol action.

In accordance with one or more aspects of the embodiments described herein, there are provided devices and apparatuses for actuating out-of-protocol action(s) and adjusting any payment accounts associated with the actuated out-of-protocol action(s). With reference to FIG. 4, there is provided an exemplary apparatus 400 that may be configured as a web server or as a processor or similar device. As depicted, apparatus 400 may include functional blocks that can represent functions implemented by a processor, software, or combination thereof (e.g., firmware).

As illustrated, apparatus 400 may comprise an electrical component 410 for receiving a request as a URL via a first communications protocol (e.g., HTTP), the request including a token code in the URL, the token code being associated with a payment account. For example, the component 410 may receive and parse the URL to extract the token code, and identify the payment account associated with the token code in a database by generating a query including the token code.

Apparatus 400 may comprise an electrical component 420 for performing a requested service via a second communications protocol, in response to the request (e.g., transferring funds, making payments, adding money to a parking meter or rechargeable account, purchasing show tickets, sending/receiving text messages, etc.). The component 420 may be configured for performing the requested service according to an action code included in the URL or associated with the token code via a database. For example, the component 420 may parse the URL to extract an action code, and use the action code as result-determinative input to a process for performing an out-of-protocol action. In the alternative, or in addition, the component 420 may obtain action parameters associated with the token code and/or action code by querying an external database. Apparatus 400 may comprise an electrical component 430 for adjusting the payment account according to the token code in the URL (i.e., debiting or crediting).

It is noted that apparatus 400 may optionally include a processor module 402 having at least one processor, in the case of apparatus 400 configured as a communication network entity, rather than as a processor. Processor 402, in such case, may be in operative communication with electrical components 410-430 via a bus 404 or similar communication coupling. Processor 402 may effect initiation and scheduling of the processes or functions performed by electrical components 410-430.

In related aspects, apparatus 400 may include a transceiver module 406. A stand alone receiver and/or stand alone transmitter may be used in lieu of or in conjunction with transceiver 406. In further related aspects, apparatus 400 may optionally include a module for storing information, such as, for example, a memory device/module 408. Computer readable medium or memory device/module 408 may be operatively coupled to the other components of apparatus 400 via bus 404 or the like. The computer readable medium or memory device 408 may be adapted to store computer readable instructions and data for effecting the processes and behavior of electrical components 410-430, and subcomponents thereof, or processor 402, or the methods disclosed herein. Memory module 408 may retain instructions for executing functions associated with electrical components 410-430. While shown as being external to memory 408, it is to be understood that one or more of electrical components 410-430 may exist within memory 408.

Having thus described embodiments of method and system for differentiated spam filtering for multiplexed e-mail receiving devices, it should be apparent to those skilled in the art that certain advantages of the within system have been achieved. It should also be appreciated that various modifications, adaptations, and alternative embodiments thereof may be made within the scope and spirit of the present invention. For example, although the examples disclosed herein describe a URL with an HTTP protocol identifier, it should be appreciated that the inventive concepts described herein may be used to enable the described functionality for URL's that identify other protocols.

It is understood that the specific order or hierarchy of steps in the processes disclosed are merely examples. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

What is claimed is:

1. A method, implemented on a computer, comprising:
receiving by the computer a Uniform Resource Locator (URL) request as an electronic message identifying a first communications protocol, the URL request comprising a token code, wherein the token code is associated with a payment account; and
performing a requested service according to an action code in the URL using an electrical component coupled to the computer in response to the request, wherein the requested service is outside of the first communications protocol, and debiting the payment account according to the token code in the URL.

2. The method of claim 1, wherein performing the requested service comprises transferring funds to one of an online store, a vending machine, a parking meter, and a cellular phone account.

3. The method of claim 1, wherein performing the requested service comprises sending or receiving a text message via a Short Messaging Service (SMS) communications protocol.

4. The method of claim 3, further comprising:
appending the text message with advertising; and
applying a credit to one of the token code and the payment account.

5. The method of claim 1, wherein the token code represents at least one of a fixed number of uses and a value in the payment account.

6. The method of claim 5, wherein the token code corresponds to a single-use token.

7. The method of claim 1, further comprising, upon completion of the requested service, transmitting a confirmation message to a user via a third communications protocol.

8. A server, comprising:
a transceiver module comprising electronic hardware for receiving a Uniform Resource Locator (URL) request identifying a hypertext transfer protocol (HTTP), the request comprising a token code and an action code in the URL, the token code associated with a payment account;
a memory module storing executable code; and
at least one processor operatively coupled with the transceiver module and the memory module and configured to execute the executable code to cause the server to:
perform a requested service via a second communications protocol, in response to the action code, wherein the second communications protocol is not the hypertext transfer protocol (HTTP); and debit the payment account according to the token code in the URL.

9. The server of claim 8, wherein the at least one processor is configured to execute the executable code to cause the server to perform the requested service by transferring funds to one of an online store, a vending machine, a parking meter, and a cellular phone account.

10. The server of claim 8, wherein the at least one processor is configured to execute the executable code to cause the server to perform the requested service by sending or receiving a text message via a Short Messaging Service (SMS) communications protocol.

11. The server of claim 10, wherein the at least one processor is configured to execute the executable code to cause the server to:
append the text message with advertising; and
apply a credit to one of the token code and the payment account.

12. The server of claim 8, wherein the token code represents at least one of a fixed number of uses and a value in the payment account.

13. The server of claim 12, wherein the token code corresponds to a single-use token.

14. The server of claim 8, wherein the at least one processor is configured to execute the executable code to cause the server to actuate transmission of a confirmation message to a user via a third communications protocol, upon completion of the requested service.

15. A non-transitory computer readable medium comprising program instructions, that when executed by a processor, cause a computer to:
parse a Uniform Resource Locator (URL) request to identify hypertext transfer protocol (HTTP) as a first communications protocol;
recognize a token code in the URL associated with a payment account and an action code in the URL;
perform a requested service based on the action code; and
transmit a message comprising a request that the payment account be debited in an amount determined by the token code in the URL.

16. The non-transitory computer readable medium of claim 15, holding further instructions, that when executed by the processor, cause the computer to transmit the message requesting that the payment account be debited to an account server for one of an online store, a vending machine, a parking meter, and a cellular phone account.

17. The non-transitory computer readable medium of claim 15, holding further instructions, that when executed by the processor, cause the computer to send or receive a text message via a Short Messaging Service (SMS) communications protocol.

18. The non-transitory computer readable medium of claim 17, holding further instructions, that when executed by the processor, cause the computer to:
append the text message with advertising; and
apply a credit to one of the token code and the payment account.

19. The non-transitory computer readable medium of claim 15, wherein the action code specifies parameters of the requested service.

20. The non-transitory computer readable medium of claim 19, wherein the token code corresponds to a single-use token.

* * * * *